United States Patent Office

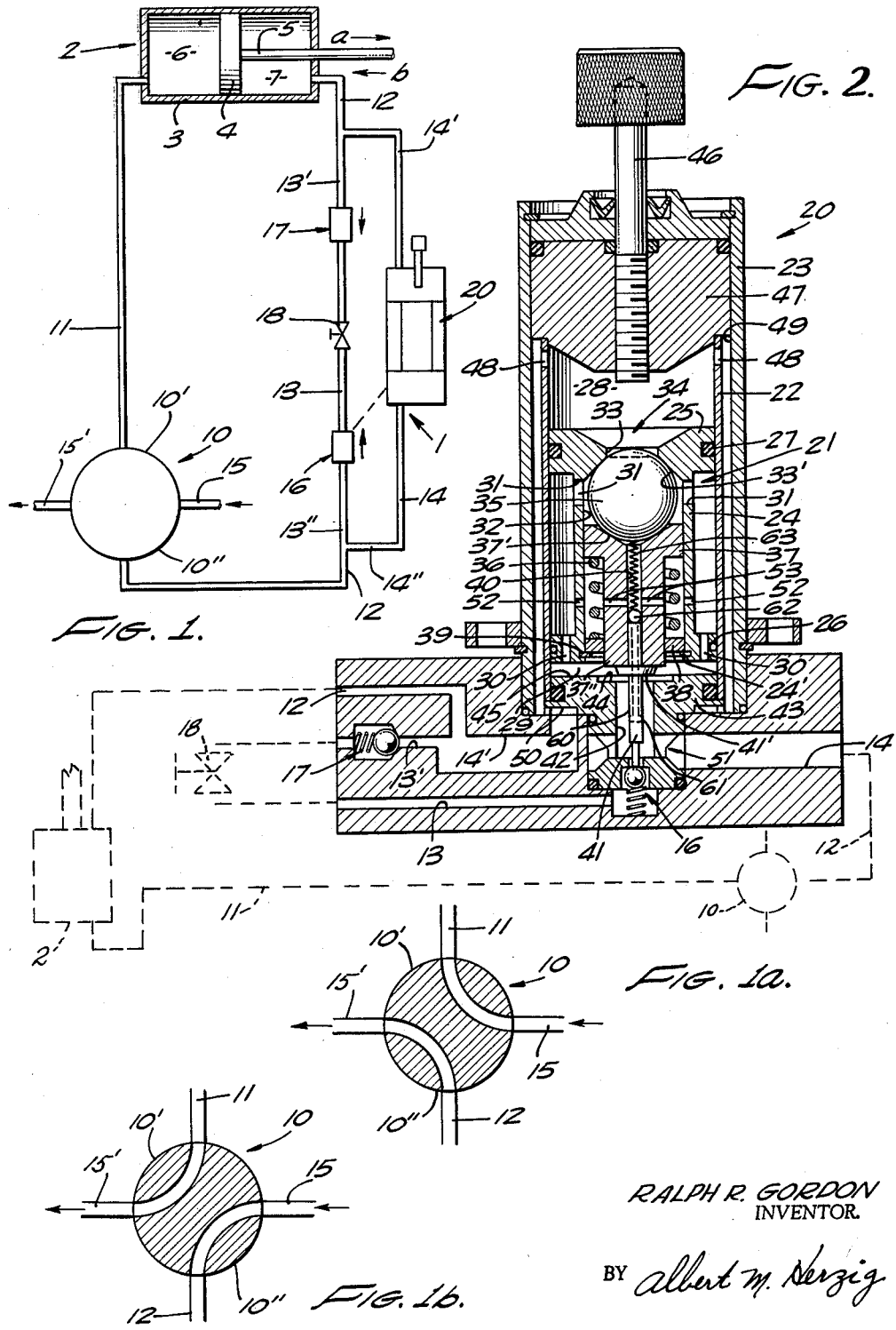

3,157,986
Patented Nov. 24, 1964

1

3,157,986
POSITIONING SYSTEM AND ITS CONTROL
Ralph R. Gordon, 5391 Ocean View Blvd.,
La Canada, Calif.
Filed Aug. 15, 1962, Ser. No. 216,997
15 Claims. (Cl. 60—10.5)

In general, the present invention relates to a control valve means for regulating fluid flow. More particularly the present invention involves a precision positioning system adapted to operate reliably over a wide variety of conditions and its control.

In the prior art, there are now many different systems adapted for automatic relative feeding of a work piece and a machine tool. Such systems are particularly adapted for use in the operation of milling machines, drill presses, machine lathes, or any other machine or machines where members, such as a tool and a work piece are to be moved at different rates of speed in the same or opposite directions for the sake of efficiency. In the case of a machine tool and work piece, it is desirable that the positioning system be adapted to effect relatively rapid movement of the tool and work piece into and out of operative working relation and relatively slow feed movement during working engagement of the tool. It is also desirable that the lengths of the fast and slow movements be variable and that the rate of movement through any portion of the reciprocatory stroke also be variable to accommodate any number of varying conditions met in practice. An illustrative example of such position is U.S. Patent 2,715,389 issued to Clarence Johnson on August 16, 1955.

As illustrated in the aforementioned Johnson Patent, such positioning systems normally employ a fluid operated piston and cylinder wherein the piston rod moves the object being manipulated. The advance stroke of such positioning piston and cylinder is normally regulated by concurrent flow in at least two parallel fluid conduits in one of which is a regulating piston and cylinder and in the other a metering valve. While such arrangement has been found useful in some applications, it has also been found that such arrangement has been subject to undesirable fluctuation in operation so as to prevent its use where high degrees of precision and reliability are required. For example, in all piston and cylinder constructions, there is a tendency for the piston to stick at the beginning or end of its stroke due to the necessarily tight fit between its sealing ring and the wall of the cylinder and inadequate lubrication between the sealing ring and the wall of the cylinder. Such a tendency is particularly aggravated when the piston has been permitted to remain stationary for any length of time when the apparatus is not in use. When such initial sticking action occurs, it necessarily means that the positioning piston and cylinder moves slowly for a short distance due to the fluid flow through the metering valve before the regulating piston and cylinder begin to move and thus causing it to advance rapidly. Such initial slow movement is, of course, bothersome and causes a time delay; however, more important, such initial movement of the positioning piston and cylinder displaces the rapid portion of its advance stroke so that it overlaps into the portion of the advance stroke which requires slow movement. Consequently, such initial sticking of the positioning piston and cylinder seriously affects the precision and accuracy of the slow portion of the advance stroke. Similar problems affecting the reliability, precision and accuracy of such precision positioning systems have also been encountered when the positioning piston sticks during its return stroke or when the operator of the positioning system adjusts the length of the rapid or slow advance stroke.

Consequently, an object of the present invention is a precise, accurate positioning system adapted to operate reliably over a wide variety of conditions.

Another object of the present invention is a control valve means which accurately and reliably permits fluid flow therethrough at a predetermined rate for a predetermined period of time and then permits fluid flow therethrough at another predetermined rate.

Another object of the present invention is a positioning system which insures rapid movement of a tool and a work piece into and out of working relation over precise, reliable distances and relatively slow feed movement during working engagement of the tool over a precise, reliable distance.

Other objects and advantages of the present invention will be readily apparent from the following descriptions and drawings which illustrate an exemplary embodiment of the present invention.

In order to facilitate understanding of the device of the present invention, reference will now be made to the appended drawings of a specific embodiment of the present invention. Such drawings should not be construed as limiting the invention, which is properly set forth in the appended claims.

FIGS. 1, 1(a) and 1(b) represent a schematic diagram of the positioning system of the present invention and illustrates the alternate adjustable valve positions with respect to the direction of movement of the positioning means.

FIG. 2 is an axial cross-section of a cylindrical regulating valve of the present invention with its associated check valves.

In FIGS. 1 and 2, a positioning system 1 is illustrated which is adapted to operate reliably over a wide variety of conditions. In positioning system 1, a positioning means 2 includes a cylinder 3, a piston 4, and a piston rod 5 for manipulating an object (not shown) by attaching said object to the piston rod 5. Positioning means 2 is operated by fluid flow alternatively into and out of opposite sides 6 and 7 respectively of its cylinder 3. An adjustable valve means 10 directs fluid flow alternatively into and out of one side 6 of positioning means 2 by means of a direct fluid conduit 11 to its first side 10'. Also, adjustable valve means 10 directs fluid flow alternatively into and out of the opposite side 7 of positioning means 2 by means of a fluid conduit 12 which separates into a first and a second parallel fluid conduit 13 and 14, respectively, between the adjustable valve means 10 and the positioning means 2. Adjustable valve means 10 is also connected to a fluid pressure conduit 15 which is in turn connected to a source of fluid pressure (not shown) and to a fluid exhaust conduit 15' which is connected to a source of fluid exhaust (not shown). It should be noted that the designation of parallel fluid conduits 13 and 14 does not refer to fluid conduits which are parallel in the geometrical sense but rather fluid conduits which are parallel in the electrical sense, i.e., fluid passing through fluid conduit 12 may pass through either fluid conduit 13 or 14 depending on the resistance encountered in the respective conduit. One pair of adjacent ends 13' and 14' of the parallel fluid conduits 13 and 14 respectively are operatively connected to the second side 7 of the positioning means 2 by means of conduit 12. The other pair of adjacent ends 13" and 14" are operatively connected to the second side 10" of adjustable valve means 2.

In the first fluid conduit 13 is a first check valve means 16 adapted to permit fluid flow only from the adjustable valve means 10 to the positioning means 2. A second check valve means 17 in the first fluid conduit 13 is adapted to permit fluid flow only from the positioning means 2 toward the adjustable valve means 10. A metering valve means 18 in the first fluid conduit 13 between the first and second check valves 16 and 17 respectively is adapted to permit fluid flow therethrough at a predetermined rate. Metering valve 18 is adjustable to permit varying the predetermined fluid flow rate therethrough over a wide range.

In the second fluid conduit 14 is a regulating valve means 20 having an operative connection to valve 16, as shown by dotted line and to be described later. Regulating valve means 20 includes a piston 21 in a cylinder 22 which is in turn mounted in a cylindrical housing 23. It should be noted that the term "cylinder" as used in the present application does not mean a cylinder in a geometrical sense but a cylinder in the mechanical sense, i.e., a structure having a bore, usually circular, therethrough. Piston 21 is adapted to be moved freely in cylinder 22 through a stroke of predetermined length. Piston 21 includes a central tubular section 24 having circumferential ridges 25 and 26 which make sliding contact with the inner wall of cylinder 22. A circular sealing ring 27 in ridge 25 seals the upper portion 28 from the lower portion 29 of cylinder 22. The parts of the lower cylinder portion 29 on opposite sides of ridge 26 of piston 21 are connected by means of ports 30 in ridge 26.

FIG. 2 shows a structural assembly including the regulating valve means 20 and valves 16 and 17 and shows, by dotted line, how it is connected to produce the arrangement shown schematically in FIG. 1. Piston 21 has a fluid conduit therethrough connecting the upper portion 28 to the lower portion 29 of cylinder 22. Such fluid conduit is formed by apertures 31 in the tubular section 24, the circular chamber 32 formed by the tubular section 24 and the hole 33 defined by the circumferential rib 25. A third check valve means 34 in the fluid conduit in the piston 21 is adapted to permit fluid flow only from the positioning means 2 to the adjustable valve means 10. Check valve means 34 includes a ball 35 with a seat 33' which forms the entrance to hole 33 through circumferential rib 25. Ball 35 is biased into seat 33' by a coil spring 36 acting against a cap 37 which is slidably mounted in chamber 32 and has a seat 37' which supports the ball 35 in place in seat 33'. The other end of coil spring 36 bears against an annular gasket 38 which is supported by a retaining ring 39 seated in a circumferential groove 24' in the tubular section 24. Cap 37 extends longitudinally downwardly in chamber 32 to form a shoulder 37" which extends slightly below the lower end of piston 21.

Cap 37 also has an axial tunnel 40 in which is seated a pin 41 which forms a first stop means mounted on piston 21. Pin 41 extends through an axial opening 42 in the lower end wall 43 of cylinder 22 and extends adjacent to first check valve 16. Pin 41 arrests the movement of piston 21 at one end of its predetermined stroke and opens first check valve means 16 to permit fluid from said positioning means 2 to the adjustable valve means 10 in the first fluid conduit 13. Channels 44 in the upper surface 45 of end wall 43 are adapted to permit fluid flow from opening 42 to the lower portion 29 of cylinder 22 when shoulder 37" of cap 37 is seated against the upper surface 45. By this means, the full fluid pressure over the entire bottom surface of piston 21 is insured when its upward stroke is initiated. Alternatively, such channels 44 may be formed on the underside of shoulder 37". However, because of bore 60 and ports 61 in pin 41, discussed below, channels 44 are not necessary, but preferable.

Preferably, pin 41 has a ridge 41' which seats against the underside of shoulder 37" and which is received in opening 42 of the lower end wall 43 of cylinder 22. Ridge 41' is slightly tapered, e.g. about 2 degrees to 4 degrees from the axis of pin 41, to a frusto-conical shape in order to partially close opening 42 during the last portion of the movement of pin 41 to open check valve 16 and thus pin 41 tends to throttle the passage of fluid through opening 42 during the last portion of its passage downward. In this way a small end portion of the travel of piston 21 downward, e.g. about 2%, is slowed down and smooth contact with the check valve 16 is assured. When such ridge 41' is used on pin 41, preferably pin 41 also includes means for permitting fluid flow therethrough only from opening 42 into cap 37. Such means involve a bore 60 along the pin axis which communicates with opening 42 by means of ports 61. Bore 60 is normally closed by a ball check valve 62 biased to close its upper end by a coil spring 63 positioned in tunnel 40 of cap 37 and seated against ball 35. When ridge 41' closes opening 42, bore 60 is adapted to permit fluid flow from opening 42 to the lower portion 29 of cylinder 22. Thus a quick response is assured when the return stroke is initiated.

A second stop means is formed by adjustable rod 46 which is threaded through the upper end wall 47 of cylinder 22 and housing 23. The rod 46 arrests the movement of piston 21 at the other end of its predetermined stroke and opens check valve means 34 to permit fluid flow from the adjustable valve means 10 to the positioning means 2 in the second fluid conduit 14. The upper portion 28 of cylinder 22 is connected to conduit 14 through ports 48 in cylinder 22, the annular passage 49 formed between cylinder 22, circular housing 23, and groove 50 in the lower surface 51 of the lower end wall 43 of cylinder 22. The second stop means formed by threaded rod 46 is adjustable to permit varying the length of the stroke of piston 21. Also, it is preferable to have ports 52 in tubular section 24 and ports 53 in cap 37 connecting lower portion 29 of cylinder 22 with the portion of circular chamber 32 enclosed by cap 37 and with the axial tunnel 40 in cap 37. Thus uniformity of fluid pressure is insured throughout the lower portions of cylinder 22.

The operation of the positioning system shown in FIGS. 1 and 2 is best described with particular reference to FIGS. 1(a) and 1(b) which illustrates the position of the four-way valve forming the adjustable valve means 10 for the advance stroke and return stroke of the positioning means 2. The advance stroke indicated by direction "a" in FIG. 1 of positioning means 2 is initiated by locating valve means 10 in the position indicated in FIG. 1(a). The advance of piston 4 in cylinder 3 is caused by fluid flow from the fluid source 15 through direct conduit 11 into portion 6 of cylinder 3. The fluid in portion 7 of cylinder 3 is then forced out through conduit 12 into the parallel conduits 13 and 14. Initially, flow through the first conduit 13 is prevented by check valve 16; therefore, the fluid flows from cylinder 3 through the second parallel conduit 14 into the upper portion 28 of cylinder 22 by means of groove 50, annular passageway 49 and ports 48. Since piston 21 in cylinder 22 is freely slidable therein and check valve 34 is biased closed by coil spring 36, piston 21 moves rapidly downward in cylinder 22 displacing fluid through the remainder of the second parallel conduit 14 and conduit 12 and out of fluid exhaust 16. Consequently, positioning means 2 is enabled to advance rapidly for a distance determined by the length of the stroke of piston 21 in cylinder 22.

Although the configuration of pin 41 slows down the piston 21 towards the end of its advance stroke, the end of the rapid portion of the advance stroke comes when the first stop means, i.e. pin 41 mounted on piston 21 contacts check valve 16 and opens it to permit fluid flow from the positioning means to the adjustable valve means in the first fluid conduit 13. At this point shoulder 37" of cap 37 rests on the upper surface 45 of the lower end wall 43 of cylinder 22 and thereby effectively ensures that check valve 34 will remain in a closed position. After first check valve means 16 is opened by pin 41, the remainder portion of the advance stroke of positioning means 2 proceeds at a slow predetermined rate set by metering valve means 18 in first conduit 13.

At the end of the advance stroke of positioning means 2, the adjustable valve means 10 is switched to the position shown in FIG. 1(b). Consequently, portion 6 of cylinder 3 of positioning means 2 has its fluid exhausted through conduit 11 to the exhaust means 16. Pressure conduit 15 is then connected through conduit 12 to the parallel branches first and second parallel conduits 13 and 14. Fluid flow through the first conduit 13 is prevented by check valve means 17. Consequently, the fluid flows in the second conduit 14 into the lower portion 29 of cylinder 22 through aperture 42, groove 44 and ports 30. Fluid flow is then permitted to rapidly proceed through second conduit 14 by the movement of piston 21 in cylinder 22 through the length of its predetermined stroke while returning to its initial position. The movement of piston 21 at the other end of its predetermined stroke is arrested by a second stop means, threaded rod 46. Rod 46 opens third check valve 34 to permit fluid flow from the adjustable valve means 10 to the positioning means 2 through second conduit 14 until piston 4 in cylinder 3 of positioning means 2 is completely retracted to its initial position. At this point the pressures throughout the system become equalized so that coil spring 36 closes check valve 34 and piston 21 is thus prepared for another advance stroke. The adjustable valve means 10 may then be changed to position shown in FIG. 1(a) to initiate the start of another cycle such as already described.

While a specific positioning system has been illustrated in FIGS. 1 and 2, it should be noted that there are many variations possible which embody the same system. For example, the connections between the adjustable valve means and the positioning means may be reversed so that fluid enters positioning means 2 during its advance stroke through fluid conduits 13 and 14 or the first and second check valve orientations may be reversed with appropriate changes in the regulating valve means. Similarly, the two stop means utilized in the regulating valve means may be reversed so that the stop means at the top is mounted on piston 21 and interacts with the first check valve means. Another variation which may be utilized in the present invention is that either liquid or gas may be the fluid which is utilized; however, liquid is preferred because it maintains substantially a constant volume and thereby achieves a more uniform rate of control. Another variation which is possible in the present invention is that the first check valve or second check valve may incorporate the metering valve means so that the two valves are combined into a single valve. Still another variation which is possible in the present invention is that the control of the adjustable valve means may be done automatically at the end of the advance stroke and the return stroke of the positioning means in a manner similar to that illustrated in the aforementioned Johnson patent.

One of the features of the present invention is its effective solution to the problem of the initial sticking of the piston in the regulating valve. Initially, it should be noted that the cross-sectional area of the third check valve means in the piston in the regulating valve has a substantially smaller cross-sectional area than the total cross-sectional area of the piston. Consequently, a very large fluid pressure must be exerted on the piston before the check valve in the piston would become unseated and such force is greatly in excess of the force necessary to overcome the initial sticking tendency of the piston. More important, it is impossible for fluid to leave the positioning means through the first parallel path because of the check valves therein. Consequently, the advance stroke must initially proceed rapidly by fluid flow through the regulating valve and it is impossible to have an initial slow movement due to fluid flow through the metering valve.

Another feature of the present invention is that on the return stroke of the positioning means of the present invention it is impossible for the piston in the regulating valve to stick and cause a subsequent displacement of the rapid portion of its advance stroke into the normally slow portion. This result is achieved by the fact that on the return stroke fluid flow is again effectively prevented through the metering valve due to the check valves in the first conduit. Consequently, all movement of the positioning means must be due to fluid flow through the regulating valve in the second conduit, thereby any tendency of the piston in the regulating valve to stick is effectively overcome.

Still another feature of the present invention is the damping of the end portion of the rapid portion of the advance stroke of the positioning means. Such result is achieved by the partial closing of the opening through which the fluid is discharged by the piston causing the discharge. In this way, the initial impact on the check valve means to be opened is greatly reduced and rebounding of the piston is substantially eliminated.

Still another feature of the present invention is that the aforedescribed regulating valve means and first check valve means may be embodied in a single control unit which may be easily installed and easily replaced if malfunctioning should occur. Consequently, the positioning system as a whole is easily maintained and should a breakdown occur, the system can be rapidly and simply returned to good working order.

It will be understood that the foregoing description and drawings are only illustrative of the present invention and it is not intended that the invention be limited thereto. Many other specific embodiments of the present invention will be obvious to one skilled in the art in view of this disclosure. All substitutions, alterations and modifications of the present invention which come within the scope of the following claims, or to which the present invention is readily susceptible without departing from the spirit and scope of this disclosure are considered part of the present invention.

I claim:

1. A precision positioning system adapted to operate reliably over a wide variety of conditions comprising:
   (a) a positioning means for an object being manipulated, said positioning means being operated by fluid flow alternately into and out of its opposite sides;
   (b) an adjustable valve means for directing fluid flow alternately into and out of the opposite sides of said positioning means, the first side of said positioning means being operatively connected directly to the first side of said adjustable valve means by a fluid conduit;
   (c) at least a first and a second parallel fluid conduit, one pair of adjacent ends of said parallel fluid conduits being operatively connected to the second side of said positioning means and the other pair of adjacent ends being operatively connected to the second side of said adjustable valve means;
   (d) a first check valve means in said first parallel fluid conduit adapted to normally permit fluid flow only from said adjustable valve means toward said positioning means;
   (e) a second check valve means in said first parallel fluid conduit adapted to permit fluid flow only from said positioning means toward said adjustable valve means;

(f) a metering valve means in said first parallel fluid conduit adapted to permit fluid flow therethrough at a predetermined rate; and (g) a regulating valve means in said second parallel fluid conduit, said regulating valve means comprising:
  (I) a piston in a cylinder therein adapted to move freely through a stroke of predetermined length, said piston having a fluid conduit therethrough,
  (II) a third check valve means in the fluid conduit in said piston adapted to permit fluid flow only in a direction from said positioning means toward said adjustable valve means,
  (III) a first stop means mounted on said piston for arresting its movement at one end of its predetermined stroke and actuating means on said piston for opening said first check valve means when said piston is at said one end to permit fluid flow from said positioning means to said adjustable valve means in said first parallel fluid conduit, and
  (IV) a second stop means mounted in said cylinder for arresting the movement of said piston at the other end of said predetermined stroke and means in said cylinder for opening said third check valve means to permit fluid flow from said adjustable valve means to said positioning means in said second parallel fluid conduit.

2. A positioning system as stated in claim 1 wherein said positioning means is a cylinder and piston with a rod attached to said piston for moving the object being manipulated.

3. A positioning system as stated in claim 1 wherein said adjustable valve means is a four-way valve.

4. A positioning system as stated in claim 1 wherein said second stop means is adjustable to permit varying the length of said piston stroke.

5. A positioning system as stated in claim 1 wherein said actuating means is a pin extending through a passageway constituting a portion of said second parallel fluid conduit leading to said regulating valve means, said pin being adapted to partially close said passageway when moving in a direction to open said first check valve means.

6. A positioning system as stated in claim 1 wherein said metering valve means is adjustable to permit varying the fluid flow rate therethrough.

7. A positioning system as stated in claim 1 wherein said actuating means is a pin extending through a passageway constituting a portion of said second parallel fluid conduit leading to said regulating valve means, said pin including means for permitting fluid flow therethrough only from said passageway into said regulating valve means.

8. A control valve assembly for permitting fluid flow therethrough at a predetermined rate for a predetermined period of time and then permitting fluid flow therethrough at another predetermined rate comprising:

(a) means defining at least first and second parallel fluid flow paths between a first and a second point between which control of fluid flow is desired;

(b) a check valve means in said first fluid flow path arranged to permit fluid flow only from said first point to said second point;

(c) a metering valve means in said first flow path arranged to permit fluid flow therethrough at a predetermined rate;

(d) flow regulating means in said second flow path comprising a piston in a cylinder in said second fluid flow path, said piston being adapted to move freely through a stroke of predetermined length;

(e) a stop means mounted on said piston for arresting its movement at one end of its predetermined stroke and means thereon for opening said check valve means when said piston is at said one end to permit fluid flow from said first point to said first point in said first fluid flow path, whereby fluid flow is initially permitted from said second point to said first point through said flow regulating means at a predetermined rate for a predetermined period of time solely through said second fluid flow path and then at another predetermined rate solely through said first fluid conduit.

9. A control valve as stated in claim 8, including:

(a) a second check valve means in said first fluid flow path adapted to permit fluid flow only in a direction from said first point toward said second point;

(b) the piston in said second fluid flow path having a fluid conduit therethrough and a third check valve means in the fluid conduit in said piston adapted to permit fluid flow only from said second point to said first point; and (c) a second stop means mounted in said cylinder for arresting the movement of said piston at the other end of said predetermined stroke and for opening said third check valve means to permit fluid flow from said first point to said second point in said second fluid flow, whereby fluid flow is permitted from said first point to said second point solely in said second flow path while said piston is returned to its initial position.

10. A control valve means as stated in claim 8 wherein said means for opening said check valve is a pin extending through a passageway constituting a portion of said second parallel fluid conduit leading to said piston and cylinder, said pin being adapted to partially close said passageway when moving to open said check valve means.

11. A control valve means as stated in claim 10 wherein said pin includes means for permitting fluid flow therethrough only from said passageway into said cylinder.

12. An easily installed and replaceable control unit adapted to be operatively associated with a metering valve in a first fluid flow path between a first and second point to form a second parallel fluid flow path between said points wherethrough said paths fluid flow is permitted at a predetermined rate for a predetermined period of time and then at another predetermined rate comprising:

(a) a check valve means in said unit in a portion thereof definitely part of said first flow path and adapted to permit fluid flow only from said first point to said second point;

(b) a piston in a cylinder formed in said unit and defining a portion of said second flow path, said piston being adapted to move freely along said cylinder through a stroke of predetermined length;

(c) a stop means mounted on said piston for arresting its movement at one end of its predetermined stroke and having means thereon for opening said check valve means to permit fluid flow from said second point to said first point in said flow path, whereby fluid flow is initially permitted to flow from said second point toward said first point through said cylinder at a predetermined rate for a predetermined period of time solely through said second flow path and then at another predetermined rate solely through said first flow path.

13. A control unit as stated in claim 12 wherein:

(a) said piston has a fluid conduit therethrough and a third check valve means in the fluid conduit in said piston adapted to permit fluid flow only from said second point to said first point; and (b) a second stop means mounted in said cylinder for arresting the movement of said piston at the other end of said predetermined stroke and for opening said third check valve means to permit fluid flow from said first point to said second point in said second flow path, whereby fluid flow is permitted from said second point to said first point solely in said second conduit while said piston is returned to its initial position.

14. A control unit as stated in claim 12 wherein said stop means is a pin extending through a passageway constituting a portion of said second parallel flow path leading to said piston and cylinder, said pin being adapted to partially close said passageway when moving to open said check valve means.

15. A control unit as stated in claim 14 wherein said pin includes means for permitting fluid flow therethrough only in one direction from said passageway.

References Cited in the file of this patent

UNITED STATES PATENTS

| | | |
|---|---|---|
| Re. 24,006 | Acton | May 24, 1955 |
| 2,715,389 | Johnson | Aug. 16, 1955 |
| 2,793,619 | Di Tirro | May 28, 1957 |
| 2,800,110 | Haarmeyer | July 23, 1957 |

FOREIGN PATENTS

| | | |
|---|---|---|
| 603,795 | Great Britain | June 23, 1948 |